(12) United States Patent
Ikehara (10) Patent No.: US 11,585,758 B2
(45) Date of Patent: Feb. 21, 2023

(54) MICROSPECTROSCOPIC DEVICE AND MICROSPECTROSCOPIC METHOD

(71) Applicant: Shimadzu Corporation, Kyoto (JP)

(72) Inventor: Tatsuya Ikehara, Kyoto (JP)

(73) Assignee: Shimadzu Corporation, Kyoto (JP)

(*) Notice: Subject to any disclaimer, the term of this patent is extended or adjusted under 35 U.S.C. 154(b) by 59 days.

(21) Appl. No.: 17/284,115

(22) PCT Filed: Sep. 27, 2019

(86) PCT No.: PCT/JP2019/038436
§ 371 (c)(1),
(2) Date: Apr. 9, 2021

(87) PCT Pub. No.: WO2020/075548
PCT Pub. Date: Apr. 16, 2020

(65) Prior Publication Data
US 2021/0381976 A1  Dec. 9, 2021

(30) Foreign Application Priority Data

Oct. 11, 2018 (JP) .............................. JP2018-192292

(51) Int. Cl.
*G01J 3/42* (2006.01)
*G01N 21/64* (2006.01)
(Continued)

(52) U.S. Cl.
CPC .............. *G01N 21/645* (2013.01); *G01J 3/42* (2013.01); *G01J 3/4406* (2013.01); *G01N 21/65* (2013.01);
(Continued)

(58) Field of Classification Search
CPC ... G01J 3/0227; G01N 21/645; G01N 21/171; G01N 21/6458; G01N 21/359;
(Continued)

(56) References Cited

U.S. PATENT DOCUMENTS

2008/0304047 A1* 12/2008 Lee ..................... G02B 21/0064
356/51
2014/0307249 A1* 10/2014 Peremans ............... G01N 21/31
356/51
(Continued)

FOREIGN PATENT DOCUMENTS

JP 2003-294618 A 10/2003
WO WO-2017030652 A1 * 2/2017 .............. G01J 3/108

OTHER PUBLICATIONS

McCamant, David W., Philipp Kukura, and Richard A. Mathies. "Femtosecond broadband stimulated Raman: a new approach for high-performance vibrational spectroscopy." Applied spectroscopy 57.11 (2003): 1317-1323. (Year: 2003).*

*Primary Examiner* — Maurice C Smith
(74) *Attorney, Agent, or Firm* — Muir Patent Law, PLLC (57) ABSTRACT

A microspectroscopic device includes: a wavelength-tunable first light source configured to emit pump-light in a mid-infrared wavelength range; a second light source configured to emit probe-light in a visible range; a light source controller configured to change a wavelength of the infrared light source; a first optical system configured to combine the pump-light and the probe-light to acquired combined light and concentrate the combined light on a minute part of a sample; a second optical system configured to block at least the probe-light from transmitted light or reflected light of the sample; a detector configured to detect light incident thereon from the second optical system; a first spectrum acquisition means configured to acquire a spectrum of the incident light during the probe-light emission to the sample as a Raman spectrum or a fluorescence spectrum of the sample; and a second spectrum acquisition means configured to acquire an infrared absorption spectrum of the sample, based on a change in the spectrum of the incident light with respect to a change in a wavelength by the light source controller
(Continued)

during the probe-light and pump-light emission to the sample.

8 Claims, 6 Drawing Sheets

(51) Int. Cl.
*G01J 3/44* (2006.01)
*G01N 21/65* (2006.01)

(52) U.S. Cl.
CPC ............... *G01N 2021/6417* (2013.01); *G01N 2021/6463* (2013.01)

(58) Field of Classification Search
CPC ......... G01N 21/636; G01N 2021/6471; G01N 2021/3595
See application file for complete search history.

(56) References Cited

U.S. PATENT DOCUMENTS

| | | | |
|---|---|---|---|
| 2017/0102532 A1* | 4/2017 | Frankel | G02B 21/0032 |
| 2017/0127947 A1* | 5/2017 | Alfano | G01N 21/65 |
| 2018/0180642 A1* | 6/2018 | Shetty | G01Q 30/02 |
| 2018/0246032 A1* | 8/2018 | Li | G01J 3/2823 |
| 2019/0120753 A1* | 4/2019 | Prater | H01J 37/226 |
| 2022/0018773 A1* | 1/2022 | Prater | G01J 3/0227 |

* cited by examiner

MICROSPECTROSCOPIC DEVICE AND MICROSPECTROSCOPIC METHOD

TECHNICAL FIELD

The present invention relates to a microspectroscopic device and a microspectroscopic method capable of acquiring a Raman spectrum or a fluorescence spectrum of a sample, and an infrared absorption spectrum, and more particularly to an integrated microspectroscopic device and microspectroscopy method capable of simultaneously acquiring them spatially and temporally.

BACKGROUND OF THE INVENTION

Conventionally, an infrared spectroscopic microscope is used for the identification of an organic matter sample (e.g., food packaging, paint, etc.), and a Raman spectroscopic microscope is used for the identification of an inorganic matter sample (e.g., metallic oxides, such as, e.g., iron and titanium).

An infrared spectroscopic microscope is a device that performs microspectroscopy in an infrared wavelength range by combining a Fourier transform infrared spectrometer and a microscope. An infrared spectroscopic microscope is designed to concentrate an infrared light flux to a very small area. In recent years, a system capable of acquiring an infrared spectrum in the 5 μm to 10 μm band using a mid-infrared laser as a light source has also been put into practical use. Note that the spatial resolution of such a system depends on the spot size of the infrared flux and is generally about 10 μm.

Further, a Raman spectroscopic microscope is a device for performing microspectroscopy in a visible range to a near infrared light wavelength range. The microscope irradiates a sample with excitation light and introduces Raman scattered light generated from the sample to a spectrometer (CCD) via a notch filter (long-pass filter), a lens, and an aperture to acquire a Raman spectrum (see, e.g., Patent Document 1). In such a system, it is possible to set the spatial resolution to 1 μm or less by focusing the light beam to the diffraction limit.

Further, infrared spectroscopy and Raman spectroscopy, which are the measurement principles of the infrared spectroscopic microscope and the Raman spectroscopic microscope described above, are vibrational spectroscopy. As described above, they differ in the activity depending on the measurement target. Thus, a Raman infrared integrated microspectroscopic device capable of simultaneously measuring both the Raman spectrum and the infrared spectrum in the same minute region has also been proposed (see, e.g., Patent Document 1).

PRIOR ART DOCUMENT

Patent Document

Patent Document 1: Japanese Unexamined Patent Application Publication No. 2003-294618

SUMMARY OF THE INVENTION

Problems to be Solved by the Invention

According to the configuration described in Patent Document 1, since both the Raman spectrum and the infrared spectrum can be measured with a single microspectroscopic device, the installation space, the measuring time, and the expense can be saved. However, according to the configuration of Patent Document 1, it is configured such that infrared light and visible light are simultaneously incident on a sample, the infrared light transmitted through the sample is detected by an infrared detector to acquire the infrared spectroscopic spectrum, and the visible light transmitted through the sample is detected by a visible light detector to acquire the Raman spectrum. Therefore, as compared with the spatial resolution (about 1 μm) of the Raman spectrum, there is a problem that the spatial resolution (about 10 μm) of the infrared spectroscopic spectrum is reduced.

The present invention has been made in view of the above circumstances. An object of the present invention is to provide a microspectroscopic device and a microspectroscopic method capable of simultaneously acquiring a Raman spectrum and an infrared spectrum high in the spatial resolution (about 1 μm) spatially and temporally.

Means for Solving the Problem

In order to attain the above-described object, a microspectroscopic device of the present invention includes:

a wavelength-tunable first light source configured to emit pump-light in a mid-infrared wavelength range;

a second light source configured to emit probe-light in a visible range;

a light source controller configured to change a wavelength of the infrared light source;

a first optical system configured to combine the pump-light and the probe-light to generate combined light and concentrate the combined light on a minute part of a sample;

a second optical system configured to block at least the probe-light from transmitted light or reflected light of the sample;

a detector configured to detect light incident thereon from the second optical system;

a first spectrum acquisition means configured to acquire a spectrum of the incident light during the probe-light emission to the sample, as a Raman spectrum or a fluorescence spectrum of the sample; and a second spectrum acquisition means configured to acquire an infrared absorption spectrum of the sample, based on a change in the spectrum of the incident light with respect to a change in a wavelength by the light source controller during the probe-light and pump-light emission to the sample.

Note that the "wavelength" recited here uniquely corresponds to the "wave number", and it is possible to assemble the same configuration using the "wave number".

Further, it may be configured such that when a wavelength of the pump-light is v, a spectrum of the incident light only during the probe-light emission to the sample is I1(v), and a spectrum of the incident light when the probe-light and pump-light emission to the sample is I2(v), the second spectrum acquisition means acquires infrared transmissivity or reflectance IRR(v) of the sample based on the following Expression (1), and generates an infrared absorption spectrum of the sample based on the infrared transmissivity or the reflectance IRR(v), $$IRR(v) = k \times I1(v)/I2(v) \tag{1}$$

where k is a predetermined coefficient.

Further, the infrared light source may be an external cavity semiconductor laser.

Further, the first optical system may combine the pump-light and the probe-light so as to become coaxial light.

Further, it may be configured such that the microspectroscopic device further includes:

a wavemeter configured to measure the wavelength of the infrared light source, wherein the light source controller changes the wavelength of the infrared light source based on the wavelength measured by the wavemeter.

Further, it may be configured such that a refractive-index distribution due to a thermal lens effect occurs around the minute part during the pump-light emission to the sample.

Further, according to another aspect of the present invention, a microspectroscopic method includes:

a step of combining pump-light in a mid-infrared wavelength range emitted from a wavelength-tunable first light source and probe-light in a visible range emitted from a second light source to acquire combined light and concentrating the combined light on a minute part of a sample;

a step of acquiring measurement light by blocking at least the probe-light from transmitted light or reflected light of the sample;

a step of acquiring a spectrum of the measurement light as a Raman spectrum or a fluorescence spectrum of the sample by emitting the probe-light to the sample; and a step of acquiring an infrared absorption spectrum of the sample, based on a change in a spectrum of the measurement light with respect to a change in a wavelength of the pump-light by emitting the probe-light and the pump-light to the sample.

Effects of the Invention

As described above, according to the microspectroscopic device and the microspectroscopic method of the present invention, only the incident light (or the measurement light) in a visible range is detected, and the Raman spectrum or the fluorescence spectrum, and the infrared absorption spectrum are acquired from the incident light (or the measurement light). Therefore, the Raman spectrum or the fluorescence spectrum, and the infrared spectrum high in the spatial resolution (about 1 µm) can be simultaneously acquired spatially and temporally.

EMBODIMENTS FOR CARRYING OUT THE INVENTION

Hereinafter, some embodiments of the present invention will be described in detail with reference to the attached figures. In the figures, the same or corresponding portion is denoted by the same reference numeral, and the description thereof will not be repeated.

First Embodiment

Figure 1:
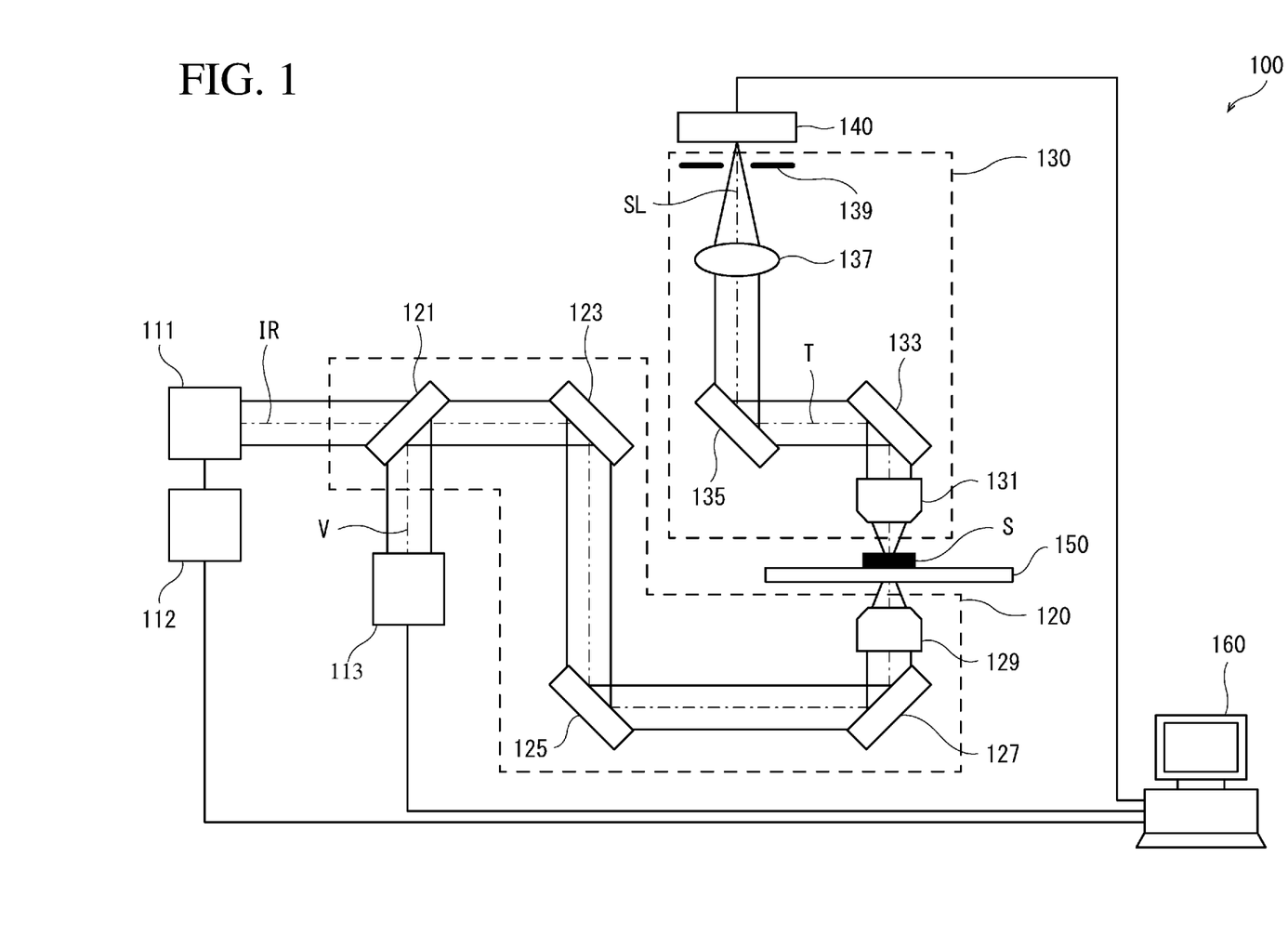
FIG. 1 is a diagram showing a schematic configuration of a microspectroscopic device according to a first embodiment of the present invention.

FIG. 1 is a diagram showing a schematic configuration of a microspectroscopic device according to a first embodiment of the present invention. As shown in FIG. 1, the microspectroscopic device 100 of this embodiment is a device for acquiring a Raman spectrum and an infrared absorption spectrum from transmitted light T of a sample S.

The microspectroscopic device 100 is provided with a wavelength-tunable infrared light source (first light source) 111, a light source controller 112, a visible light source (second light source) 113, a stage 150, a first optical system 120, a detector 140, a second optical system 130, and a computer 160. The wavelength-tunable infrared light source (first light source) 111 emits pump-light IR in a mid-infrared wavelength range. The light source controller 112 changes the wavelength of the infrared light source 111. The visible light source (second light source) 113 emits probe-light V in a visible range. The stage 150 is configured to place a sample S thereon. The first optical system 120 guides the pump-light IR and the probe-light V from the infrared light source 111 and the visible light source 113 onto the stage 150. The detector 140 detects transmitted light T of the sample S. The second optical system 130 guides the transmitted light T of the sample S from the sample S to the detector 140. The computer 160 controls the light source controller 112, the visible light source 113, and the detector 140 and calculates the Raman spectrum and the infrared absorption spectrum.

The infrared light source 111 is wavelength-tunable in the wavelength range (e.g., 3 µm to 10 µm) of the infrared absorption spectrum of the sample S and is configured by, for example, a quantum cascade laser (QCL) or an injection-current-controlled wavelength-tunable diode laser. Note that it is configured such that the pump-light IR is emitted as substantially parallel light from the infrared light source 111.

The light source controller 112 is an electronic circuit connected to the infrared light source 111 and the computer 160 to control the infrared light source 111 according to the instruction of the computer 160. The light source controller 112 turns the infrared light source 111 on/off to make the infrared light source 111 emit light at a predetermined wavelength and light quantity according to the instruction from the computer 160.

The visible light source 113 is a light source that emits light of a wavelength (e.g., 500 nm to 900 nm) capable of measuring the Raman spectrum of the sample S and is configured by, for example, a semiconducting laser. The visible light source 113 is connected to the computer 160 and is turned on/off in accordance with the instruction from the computer 160. Note that it is configured such that the probe-light V is emitted as substantially parallel light from the visible light source 113.

The first optical system 120 is configured by a filter 121, a mirror 123, a mirror 125, a mirror 127, and an objective lens 129. The filter 121 is a so-called long-pass filter that allows the transmission of the pump-light IR from the infrared light source 111 and reflects the probe-light V from the visible light source 113 toward the mirror 123. In this embodiment, by the filter 121, the pump-light IR and the probe-light V are overlapped and combined to become coaxial light. The mirrors 123, 125, and 127 each are a reflection member for guiding the pump-light IR and the probe-light V from the filter 121 to the objective lens 129.

The objective lens 129 is an optical member that focuses the pump-light IR and the probe-light V from the mirror 127 onto the minute part of the sample S on the stage 150.

The stage 150 is a transparent plate-like member made of, e.g., glass, on which the sample S is placed. The pump-light IR and the probe-light V from the objective lens 129 are transmitted through the stage 150 while being concentrated and are incident on the sample S on the stage 150. Then, the transmitted light T transmitted through the sample S is configured to be emitted toward the second optical system 130 of the objective lens 131. Note that the transmitted light T of this embodiment includes Stokes Raman scattered light (hereinafter referred to as "Raman scattered light SL") generated by the probe-light V and the sample S (the detailed will be described later).

The second optical system 130 is configured by an objective lens 131, a mirror 133, a filter 135, a lens 137, and an aperture 139. The objective lens 131 is an optical member for shaping the transmitted light T transmitted through the sample S so as to become substantially parallel light and outputs the shaped transmitted light T to the mirror 133. The mirror 133 is a reflection member for guiding the transmitted light T from the objective lens 131 to the filter 135. The filter 135 is a so-called short-pass filter or a notch filter that allows the transmission of the probe-light V included in the transmitted light T and reflects the Raman scattered light SL included in the transmitted light T and longer in the wavelength than the probe-light V toward the lens 137. The lens 137 is an optical member for focusing the Raman scattered light SL from the filter 135 to the entrance port (not shown) of the detector 140. The aperture 139 is a member having a circular aperture stop disposed between the lens 137 and the entrance port of the detector 140 to shape the Raman scattered light SL from the lens 137 to a predetermined beam diameter and cut unwanted light.

The detector 140 is a device for detecting the Raman scattered light SL incident through the aperture 139, and for example is a spectrometer capable of measuring the spectrum and the light quantity of the Raman scattered light SL. The detector 140 is connected to the computer 160 and measures the spectrum of the Raman scattered light SL according to the instruction from the computer 160.

The computer 160 is a device that controls the light source controller 112, the visible light source 113, and the detector 140, according to the instruction from the user and calculates the Raman spectrum and the infrared absorption spectrum, and is configured by, for example, a general-purpose PC (Personal Computer).

(Measurement Procedures of Acquiring Raman Spectrum and Infrared Absorption Spectrum)

Figure 2:
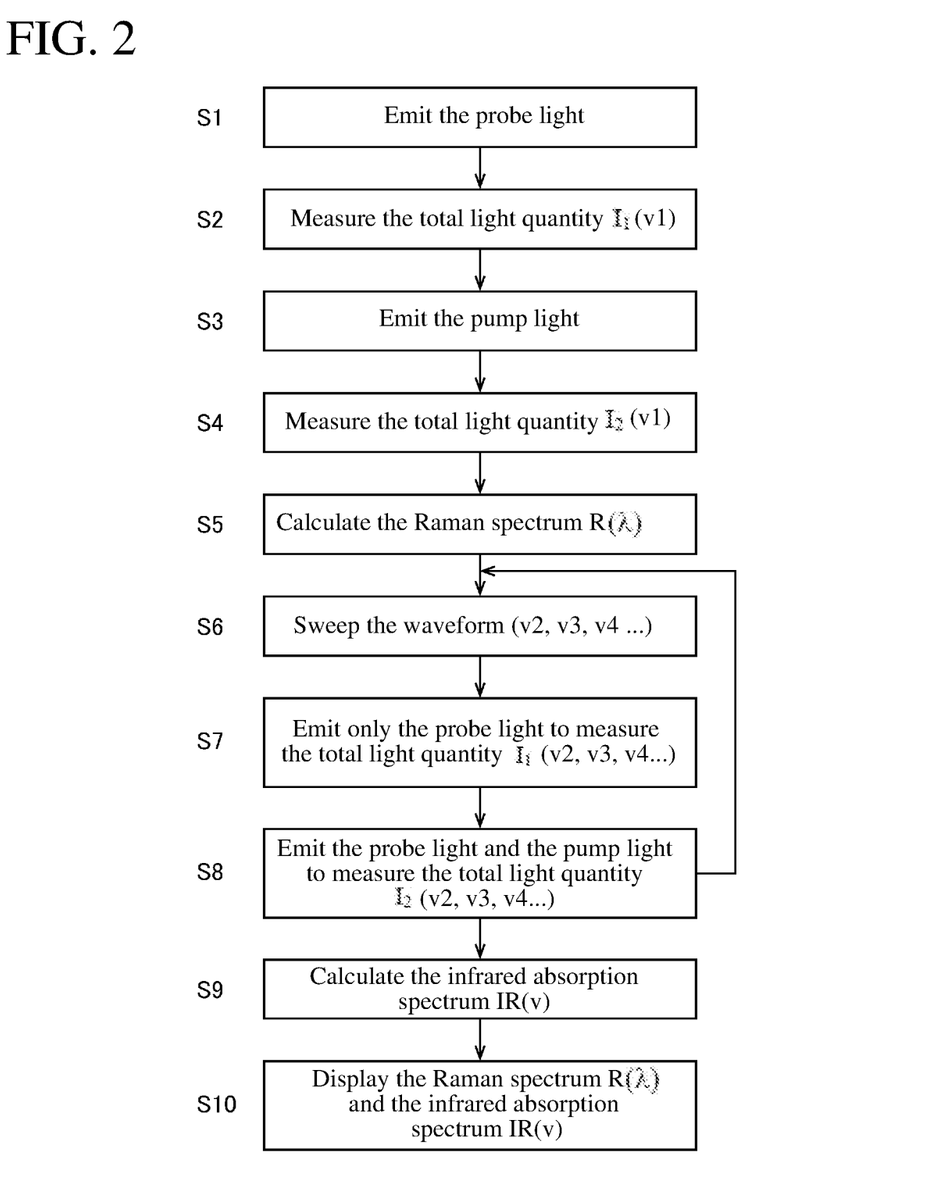
FIG. 2 is a flowchart showing the procedures for measuring a Raman spectrum and an infrared absorption spectrum using the microspectroscopic device according to the first embodiment of the present invention.

FIG. 2 is a flowchart showing the procedures for measuring the Raman spectrum and the infrared absorption spectrum using the microspectroscopic device 100 according to this embodiment. As shown in FIG. 2, in the measurement procedure of this embodiment, first, upon receiving an instruction from the user, the computer 160 controls the visible light source 113 to emit the probe-light V of a predetermined light quantity (Step S1). The probe-light V from the visible light source 113 is emitted to the sample S on the stage 150 via the filter 121, the mirror 123, the mirror 125, the mirror 127, and the objective lens 129. Then, the transmitted light T of the sample S is emitted to the filter 135 through the objective lens 131 and the mirror 133, and only the Raman scattered light SL is extracted by the filter 135. The Raman scattered light SL is incident on the detector 140 via the lens 137 and the aperture 139. The computer 160 then controls the detector 140 to acquire the total light quantity (spectrum) I1(v1) detected by the detector 140 (Step S2).

Figure 3:
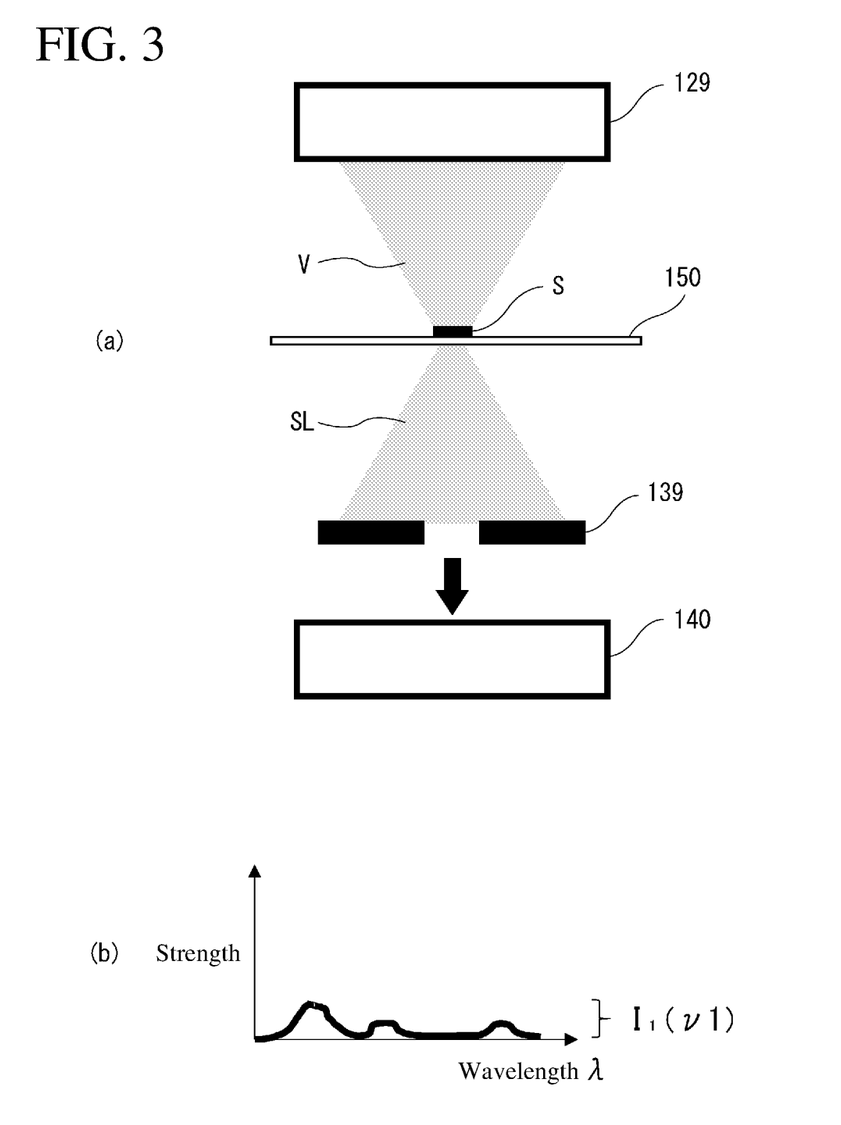
FIG. 3 is a diagram for explaining the state of the microspectroscopic device when it is in Step S2 of FIG. 2.

FIG. 3 is a diagram explaining the state when it is in Step S2. (a) of FIG. 3 is a schematic diagram for explaining the relation between the probe-light V and the Raman scattered light SL. (b) of FIG. 3 is a graph showing one example of the total light quantity I1(v1) acquired in Step S2. In (a) of FIG. 3, for convenience of explanation, the light from the objective lens 129 to the detector 140 is shown, and the objective lens 131, the mirror 133, the filter 135, and the lens 137 are omitted.

As shown in (a) of FIG. 3, when it is in Step S2, the probe-light V is emitted to the sample S on the stage 150, and the Raman scattered light SL of the sample S is shaped by the aperture 139 and is incident on the detector 140. Then, the total light quantity I1(v1) is detected by the detector 140 ((b) of FIG. 3).

Returning to FIG. 2, upon completion of Step S2, the computer 160 controls the infrared light source 111 through the light source controller 112 through to emit the pump-light IR of a predetermined minimum wavelength (v1) (Step S3). The pump-light IR from the infrared light source 111 is emitted to the sample S on the stage 150 via the filter 121, the mirror 123, the mirror 125, the mirror 127, and the objective lens 129. Then, the computer 160 controls the detector 140 to acquire the total light quantity I2(v1) detected by the detector 140 (Step S4).

Figure 4:
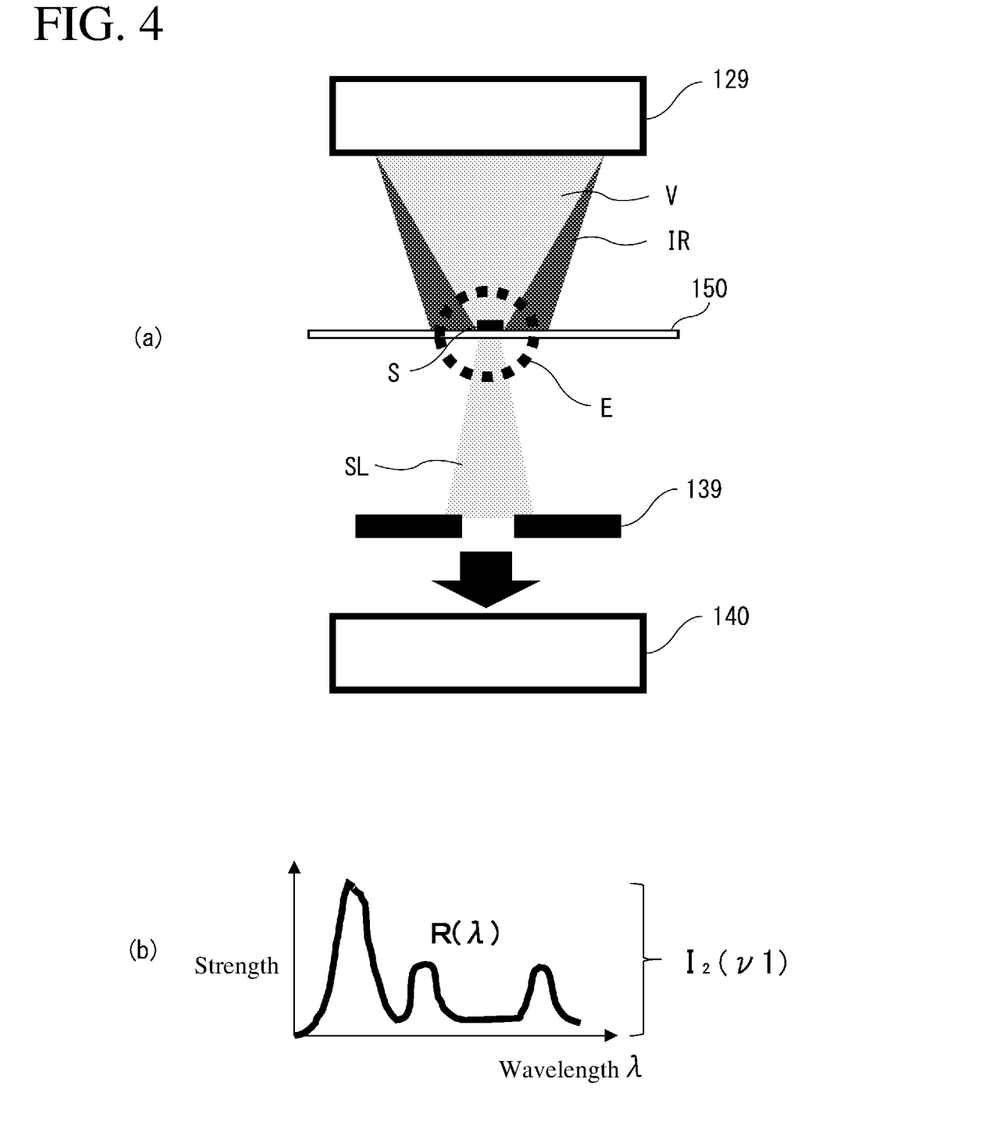
FIG. 4 is a diagram for explaining the state of the microspectroscopic device when it is in Step S4 in FIG. 2.

FIG. 4 is a diagram for explaining the state when it is in Step S4. (a) of FIG. 4 is a schematic diagram for explaining the relation between the probe-light V and the pump-light IR, and the Raman scattered light SL. (b) of FIG. 4 is a graph showing one example of the total light quantity I2(v1) acquired in Step S4. In (a) of FIG. 4, for convenience of explanation, similar to (a) of FIG. 3, the light from the objective lens 129 to the detector 140 is shown, and the objective lens 131, the mirror 133, the filter 135, the lens 137 are omitted.

As shown in (a) of FIG. 4, when it is in Step S4, the pump-light IR and the probe-light V are emitted to the sample S on the stage 150. Therefore, the thermal lens effect E due to the pump-light IR occurs (i.e., the refractive index is changed) around the sample S. As compared with the case when it is in Step S2 ((a) of FIG. 3), the spread angle of the Raman scattered light SL is reduced. Thus, the vignetting due to the aperture 139 is decreased (i.e., the light quantity passing through the opening of aperture 139 is increased), and the total light quantity I2(v1) detected by the detector 140 is increased, as compared with the total light quantity I1(v1) when the pump-light IR is not present ((b) of FIG. 4). Note that it is known that the infrared transmissivity IRR by the thermal lens effect E can generally be expressed by the following Expression (1) and changes with the wavelength of the pump-light IR (that is, there is a wavelength dependence in the infrared transmissivity IRR).

$$IRR(v1) = k \times I1(v1)/I2(v1) \qquad (1)$$

In Expression (1), k is a predetermined coefficient.

Therefore, in this embodiment, the Raman spectrum R($\lambda$) is calculated from the total light quantity I2(v1) and the infrared transmissivity IRR when it is in Step S4. Further, utilizing the wavelength dependence of the infrared transmissivity IRR, the infrared absorption spectrum IR(v) is calculated.

Specifically, in Step S5, the computer 160 calculates the Raman spectrum R($\lambda$) based on the total light quantity I2(v1) acquired in Step S4 and the Expression (1) (see FIG. 2).

Further, in Steps S6, S7, and S8, the computer 160 controls the infrared light source 111 via the light source controller 112, controls the detector 140, and emits only the probe-light V in each wavelength (v2, v3, v4 . . . ) while sweeping the wavelength of the pump-light IR at v2, v3, v4 . . . (Step S6) to acquire to the total light quantity I1 (v2, v3, v4 . . . ) (Step S7), and acquire the total light quantity I2 (v2, v3, v4 . . . ) by emitting the probe-light V and the pump light IR (Step S8). Then, the infrared absorption spectrum IR(v) is calculated from the total light quantity I2 (v1) acquired in Step S5, the total light quantity I2 (v2, v3, v4, . . . ) acquired in Step S8, and the infrared transmissivity IRR (v1, v2, v3, v4, . . . ) at each wavelength acquired in Expression (1) (Step S9).

That is, for the infrared absorption spectrum IR(v) of this embodiment, generalizing, when the wavelength of the pump-light IR is v, the light quantity of the incident light only during the probe-light V emission to the sample S is I1(v), and the light quantity of the incident light during the probe-light V and pump-light IR emission to the sample S is I2 (v), the infrared transmissivity IRR(v) of the sample S is acquired based on the following Expression (2), and the infrared absorption spectrum of the sample S is generated based on the infrared transmissivity IRR(v).

$$IRR(v)=k \times I1(v)/I2(v) \qquad (2)$$

In Expression (2), k is a predetermined coefficient.

Then, the computer 160 displays the Raman spectrum R(λ) obtained in Step S5 and the infrared absorption spectrum IR(v) obtained in Step S5 on a monitor (not shown).

Thus, in this embodiment, the infrared absorption spectrum IR(v) is calculated by utilizing the fact that the infrared transmissivity IRR changes by the thermal lens effect E by the pump-light IR. In other words, in this embodiment, instead of directly measuring the absorption of infrared as in the prior art, the change in the spectrum of the visible light (i.e., the Raman scattered light SL) due to the change in the wavelength of the pump-light IR is measured to acquire the infrared absorption spectrum IR(v). Thus, according to the configuration of this embodiment, in the same manner as in the Raman spectrum R(λ), the infrared absorption spectrum IR(v) high in the spatial resolution can be acquired. Further, according to the configuration of this embodiment, since it is enough to use only one detector 140 capable of acquiring only the spectrum of the visible light (i.e., the Raman scattered light SL), a spectrometer for acquiring the spectrum of the infrared region as in the prior art is not required.

Although an embodiment of the present invention has been described above, the present invention is not limited to the configuration of the embodiment and a specific numerical configuration, etc., and various modifications may be made within the scope of the technical concept of the present invention.

For example, the microspectroscopic device 100 of this embodiment has been described as a device for acquiring the Raman spectrum and the infrared absorption spectrum from the transmitted light T of the sample S. However, in a case where the sample S contains a material that fluoresces, a fluorescence spectrum is measured instead of a Raman spectrum.

Further, in this embodiment, although the Raman spectrum R(λ) is calculated from the total light quantity I2(v1) when the pump-light IR and the probe-light V of the lowest wavelengths (v1) are irradiated and the total light quantity I1(v1) when the pump-light IR is not emitted (FIG. 2: Step S5), the present invention is not necessarily limited to such a configuration. The Raman spectrum R(λ) does not depend on the wavelength of the pump-light IR, any of the total light quantity I1(v1, v2, v3, v4 . . . ) when only the pump-light IR is emitted can be the Raman spectrum R(λ).

Second Embodiment

Figure 5:
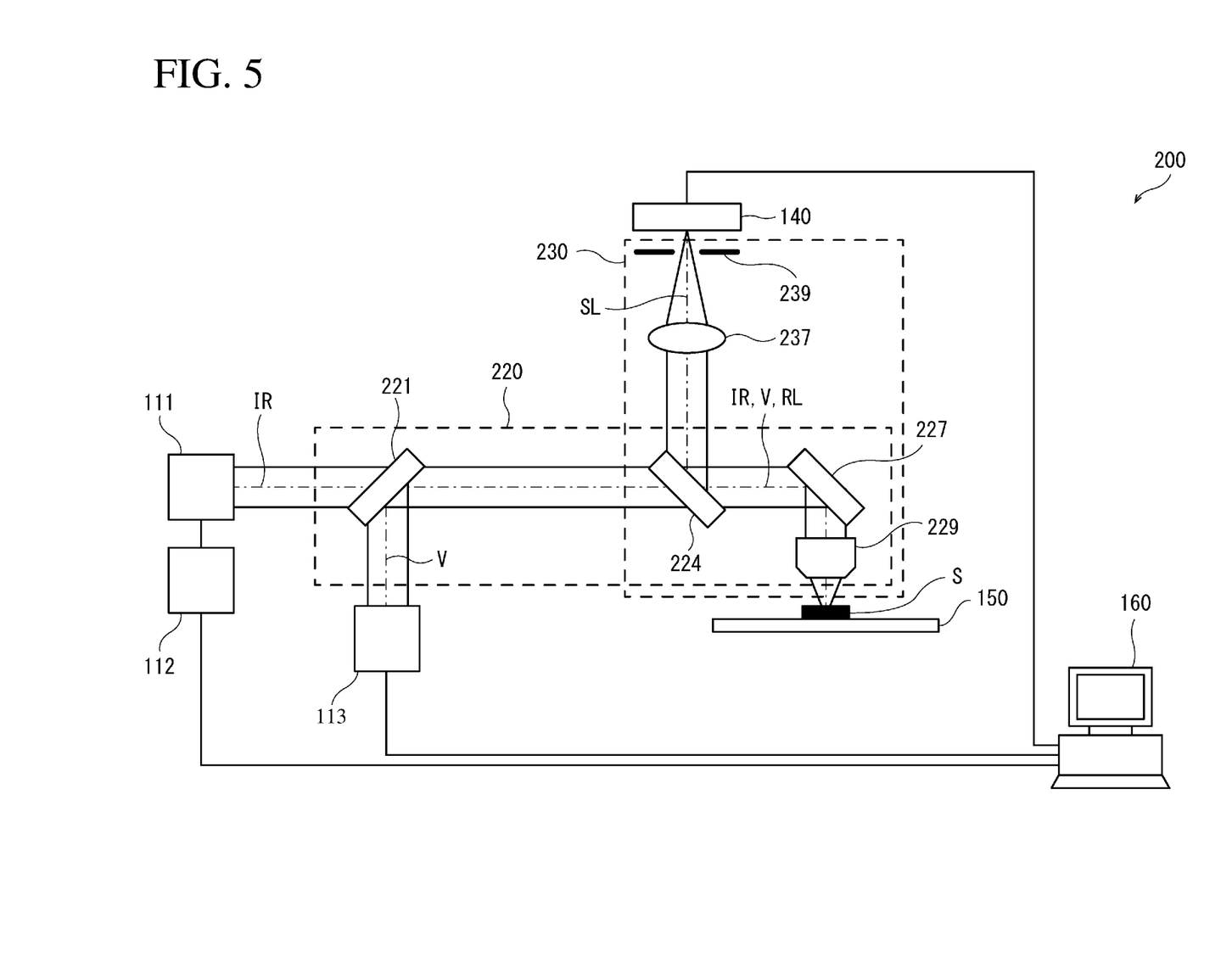
FIG. 5 is a diagram showing the schematic configuration of the microspectroscopic device according to a second embodiment of the present invention.

FIG. 5 is a diagram showing a schematic configuration of a microspectroscopic device according to a second embodiment of the present invention. As shown in FIG. 5, the microspectroscopic device 200 of this embodiment is a device for acquiring the Raman spectrum and the infrared absorption spectrum from the reflected light RL of the sample S, and is different from the microspectroscopic device 100 of the first embodiment in that the configurations of the first optical system 220 and the second optical system 230 differ.

The first optical system 220 of this embodiment is composed of a filter 221, a filter 224, a mirror 227, and an objective lens 229. The second optical system 230 is composed of an objective lens 229, a mirror 227, a filter 224, a lens 237, and an aperture 239. That is, the filter 224, the mirror 227, and the objective lens 229 serve as the first optical system 220 and the second optical system 230.

The filter 221 is a so-called long-pass filter that allows the transmission of the pump-light IR from the infrared light source 111 and reflects the probe-light V from the visible light source 113 toward the filter 224. Further, in this embodiment, the pump-light IR and the probe-light V are overlapped by the filter 221 and combined so as to become coaxial light. The filter 224 is a so-called short-pass filter or a notch filter 224 that allows the transmission of the pump-light IR and the probe-light V toward the mirror 227, allows the transmission of the pump-light IR and the probe-light V included in the reflected light RL emitted from the mirror 227 toward the filter 224, and reflects the Raman scattered light SL having a wavelength longer than the probe-light V included in the reflected light RL toward the lens 237. The mirror 227 is a reflection member for guiding the pump-light IR and the probe-light V from the filter 224 to the objective lens 229 and for guiding the reflected light RL from the objective lens 229 to the filter 224. The objective lens 229 is an optical member for focusing the pump-light IR and the probe-light V from the mirror 227 on the minute part of the sample S on the stage 150 and for shaping the reflected light RL reflected by the sample S so as to become substantially parallel light. Thus, in this embodiment, the reflected light RL reflected by the sample S reversely travels through the objective lens 229, the mirror 227, the filter 224 (i.e., in the direction opposite to the light IR and the probe-light V). The Raman scattered light SL reflected by the filter 224 is focused by the lens 237, transmitted through the aperture 239, and focused on the entrance port (not shown) of the detector 140.

The Raman scattered light SL incident on the detector 140 is processed in accordance with the above-described measurement procedures of the Raman spectrum and the infrared absorption spectrum (see FIG. 2 to FIG. 4), and the infrared absorption spectrum IR(v) and the Raman spectrum R(λ) are acquired in the same manner as in the first embodiment. In this case, the "infrared transmissivity IRR" of the first embodiment may be read and applied as the "infrared reflectance IRR".

Third Embodiment

Figure 6:
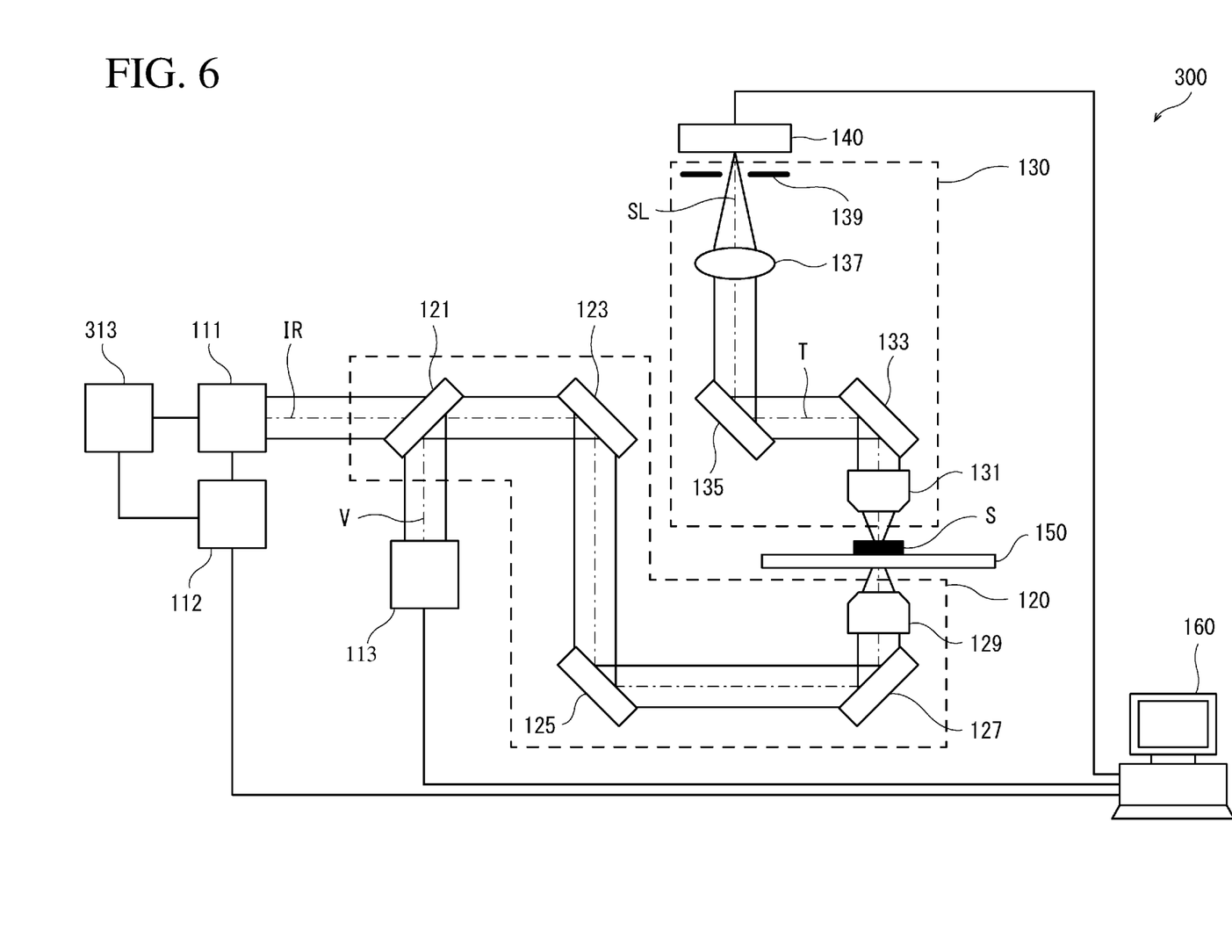
FIG. 6 is a diagram showing the schematic configuration of the microspectroscopic device according to a third embodiment of the present invention.

FIG. 6 is a diagram showing a schematic configuration of a microspectroscopic device according to a third embodiment of the present invention. As shown in FIG. 6, the microspectroscopic device 300 of this embodiment differs from the microspectroscopic device 100 of the first embodiment in that it is provided with a wavemeter 313 for measuring the wavelength of the pump-light IR 313 emitted from the infrared light source 111.

The wavemeter 313 of this embodiment is a device, such as, e.g., a Fabry-Perot interferometer or Fizeau interferometer, in which two etalons are placed in parallel, and is configured to measure the wavelength of the pump-light IR emitted from the infrared light source 111 and output the result to the light source controller 112. Therefore, the light source controller 112 feeds back the output from the wavemeter 313 to the infrared light source 111 (i.e., corrects the wavelength of the infrared light source 111), so that the pump-light IR of the desired precise wavelength is output from the infrared light source 111.

Thus, according to the configuration of this embodiment, a more accurate infrared absorption spectrum IR(ν) and Raman spectrum R(λ) can be acquired.

In this embodiment, the wavemeter 313 measures the wavelength of the pump-light IR emitted from the infrared light source 111. However, the wavemeter 313 may measure the wavelength of the pump-light IR in the first optical system 120. For example, it may be arranged close to the mirror 127. In this case, the wavelength correction and the intensity correction can be performed considering the absorption of water present in the first optical system 120 and the effects of the optical absorption by optical components.

DESCRIPTION OF SYMBOLS 100, 200, 300: Microspectroscopic device
111: Infrared light source
112: Light source controller
113: Visible light source
120, 220: First optical system
121, 135, 221, 224: Filter
123, 125, 127, 133, 227: Mirror
129, 131, 229: Objective lens
130, 230: Second optical system
137, 237: Lens
139, 239: Aperture
140: Detector
150: Stage
160: Computer
313: Wavemeter

The invention claimed is:

1. A microspectroscopic device comprising:
a wavelength-tunable first light source configured to emit pump-light in a mid-infrared wavelength range;
a second light source configured to emit probe-light in a visible range;
a light source controller configured to change a wavelength of the first light source;
a first optical system configured to combine the pump-light and the probe-light to generate combined light and concentrate the combined light on a part of a sample;
a second optical system configured to block at least the probe-light from transmitted light or reflected light of the sample;
a detector configured to detect light incident thereon from the second optical system;
a first spectrum acquisition means configured to acquire a spectrum of the incident light during only the probe-light emission, as a Raman spectrum or a fluorescence spectrum of the sample; and
a second spectrum acquisition means configured to acquire an infrared absorption spectrum of the sample, based on a change in the spectrum of the incident light with respect to a change in a wavelength by the light source controller during the probe-light and pump-light emission to the sample.

2. The microspectroscopic device as recited in claim 1, wherein when a wavelength of the pump-light is ν, a spectrum of the incident light only during the probe-light emission to the sample is I1(ν), and a spectrum of the incident light during the probe-light and pump-light emission to the sample is I2(ν),
the second spectrum acquisition means acquires infrared transmissivity or reflectance IRR(ν) of the sample based on the following Expression (1), and generates an infrared absorption spectrum of the sample based on the infrared transmissivity or the reflectance IRR(ν), $$IRR(\nu) = k \times I1(\nu)/I2(\nu) \quad (1)$$

where k is a predetermined coefficient.

3. The microspectroscopic device as recited in claim 1, wherein the first light source is an external cavity semiconductor laser.

4. The microspectroscopic device as recited in claim 1, wherein the first optical system combines the pump-light and the probe-light so as to become coaxial light.

5. The microspectroscopic device as recited in claim 1, further comprising:
a wavemeter configured to measure the wavelength of the first light source,
wherein the light source controller changes the wavelength of the first light source based on the wavelength measured by the wavemeter.

6. The microspectroscopic device as recited in claim 1, wherein a refractive-index distribution due to a thermal lens effect occurs around the part of the sample when the pump-light is emitted to the sample.

7. A microspectroscopic method comprising:
a step of combining pump-light in a mid-infrared wavelength range emitted from a wavelength-tunable first light source and probe-light in a visible range emitted from a second light source to acquire combined light and concentrating the combined light on a part of a sample;
a step of acquiring measurement light by blocking at least the probe-light from transmitted light or reflected light of the sample;
a step of acquiring a spectrum of the measurement light as a Raman spectrum or a fluorescence spectrum of the sample by emitting only the probe-light to the sample; and
a step of acquiring an infrared absorption spectrum of the sample, based on a change in a spectrum of the measurement light with respect to a change in a wavelength of the pump-light by emitting the probe-light and the pump-light to the sample.

8. The microspectroscopic method as recited in claim 7, wherein when a wavelength of the pump-light is ν, the spectrum of the measurement light when only the probe-light is emitted to the sample is I1(ν), and a spectrum of incident light when the probe-light and the pump-light are emitted to the sample is I2(ν),
in the step of acquiring the infrared absorption spectrum of the sample, infrared transmissivity or reflectance IRR(ν) of the sample is acquired based on the following Expression (1), and the infrared absorption spectrum of the sample is generated based on the infrared transmissivity or the reflectance IRR(v), $$IRR(v) = k \times (v)/I2(v) \qquad (1)$$

where k is a predetermined coefficient.

* * * * *